United States Patent [19]

Riccio

[11] Patent Number: 5,413,033
[45] Date of Patent: May 9, 1995

[54] OVEN WITH A STONE COVERED BOTTOM

[76] Inventor: Renato S. Riccio, 11350 Pagemill, Dallas, Tex. 75243

[21] Appl. No.: 141,349

[22] Filed: Oct. 22, 1993

[51] Int. Cl.[6] .............................................. A21B 1/02
[52] U.S. Cl. .................................. 99/339; 99/482; 126/19 R; 126/21 R; 126/273 R; 126/273.5; 126/275 R
[58] Field of Search .......... 99/339, 467, 473, 480–482; 126/19 R, 21 R, 21 A, 273 R, 273.5, 275 R, 276

[56] References Cited

U.S. PATENT DOCUMENTS

| | | | |
|---|---|---|---|
| 1,045,643 | 11/1912 | Tucker | 99/482 |
| 1,116,135 | 11/1914 | Sebessy et al. | 99/480 |
| 1,168,769 | 1/1916 | Vollmer | 126/275 R |
| 1,296,519 | 3/1919 | Hill et al. | 99/480 |
| 1,878,064 | 9/1932 | Triplett | 126/273 R |
| 2,004,024 | 6/1935 | Van Voorst, Jr. | 99/480 |
| 3,130,662 | 4/1964 | Robinson | 99/482 |
| 3,517,602 | 6/1970 | Horton | 99/482 |
| 3,756,140 | 9/1973 | Kolivas | 99/339 |
| 3,967,547 | 7/1976 | Sykes et al. | 99/473 |
| 4,095,586 | 6/1978 | Selva | 126/273 R |
| 4,474,165 | 10/1984 | Richardson | 126/273 R |
| 4,702,224 | 10/1987 | Griffith | 99/482 |
| 5,119,719 | 6/1992 | DePasquale | 126/21 A |

FOREIGN PATENT DOCUMENTS

| | | | |
|---|---|---|---|
| 186045 | 6/1956 | Austria | 126/273.5 |
| 92631 | 11/1983 | European Pat. Off. | 126/276 |
| 265914 | 5/1988 | European Pat. Off. | 126/19 R |
| 560366 | 10/1923 | France | 99/473 |
| 2502749 | 10/1982 | France | 126/19 R |
| 2613819 | 10/1988 | France | 126/19 R |
| 2627954 | 9/1989 | France | 126/19 R |
| 2100628 | 4/1990 | Japan | 99/482 |

Primary Examiner—Mark Spisich
Attorney, Agent, or Firm—Harry C. Post, III

[57] ABSTRACT

An oven for baking a food product. The oven comprises a stone covered bottom that includes a baking area in which the food product may be baked. A top is connected to the bottom and constructed to form a domed chamber over the baking area. A constant heat source is connected to the bottom to provide a constant heat within the chamber. A first passageway extends through the top and has a size sufficient to pass an unbaked food product into the chamber. A second passageway extends through the top and has a size sufficient to remove a baked food product from the chamber.

21 Claims, 5 Drawing Sheets

OVEN WITH A STONE COVERED BOTTOM

TECHNICAL FIELD

This invention relates to an oven for baking bread, pizza and related food products, and, more particularly, to an oven having a domed baking chamber with a stone bottom, such as that used in commercial establishments.

BACKGROUND ART

It is well known that certain commercial establishments have baked bread, pizza and related food products in ovens that are frequently called a brick oven, a stone oven or an oven with a similar name.

The prior art ovens typically have a bottom covered with a plurality of stones on which the food products are baked. A top is connected to the bottom and constructed to form a domed chamber over a baking area located on the plurality of stones. A heat source is used to provide a constant heat within the chamber because the baked food product is adversely effected from a lack of constant heat, which may occur when air freely flows to the heat source. A single passageway is provided to extend through the top through which the unbaked food product is passed into the chamber and a baked food product is removed from the chamber. Because the food products are baked, it is desirable that the ovens provide a constant temperature to the food product. To accomplish this desired result, the access into the chamber of this type oven is limited to a single passageway and the heat source being used provides a constant heat. However, the single passageway severely limits access to the oven chamber, which limits the production of baked food product. This-in-turn, prevents these commercial establishments from producing the desired quantity of baked food product. Thus, a consumer must pay high prices for this type food product or consume a food product that is baked differently.

Further, these prior art ovens may include a heat source to burn a solid fuel, which provides a flavor to the food product being baked. This flavor enhancing heat source, however, is supplied with the solid fuel before heating the chamber and set afire. Because the ovens have only a single passageway, the flavor enhancement only occurs while the solid fuel is being burned. After the fire has died, then the flavor enhancement changes. Thus, the flavor does not occur uniformly for the baking of all the food products.

Accordingly, it is an object of the present invention to provide a stone bottom oven with multiple passageways allowing access into the chamber of an oven to increase the production from such an oven.

Further, it is an object of the present invention to provide a stone bottom oven provides a uniform flavor enhancing heat source may be provided with a solid fuel after the baking cycle has begun.

Further, it is an object of the present invention to provide a stoned bottom oven with multiple passageways allowing access into the chamber of an oven that prevents the free access of air into the chamber.

Further, it is an object of the present invention to provide a stone bottom oven with multiple passageways allowing access into the chamber of an oven that prevents the free access of air into the chamber by using a door mounted to the top while providing sufficient air to completely burn the fuels and prevent the formation of soot on the food product.

Further, it is an object of the present invention to provide a stone bottom oven with multiple passageways allowing access into the chamber of an oven that prevents the free access of air into the chamber by using a fire burning a solid fuel, which provides a flavor enhancement to the food product being baked.

Further, it is an object of the present invention to provide a stone bottom oven with multiple passageways allowing access into the chamber of an oven that permits removal of ashes from a solid fuel burning source without interrupting the baking of the food product.

DISCLOSURE OF THE INVENTION

In accordance with the present invention there is provided an oven for baking bread. The oven comprises a stone covered bottom including a baking area in which the bread may be baked. A top is connected to the bottom and constructed to form a domed chamber over the baking area. A constant heat source is connected to the bottom to provide a constant heat within the chamber. A first passageway extends through the top and has a size sufficient to pass an unbaked bread into the chamber. A second passageway extends through the top and has a size sufficient to remove a baked bread from the chamber.

Further, in accordance with the present invention there is provided an oven for baking bread. The oven comprises a stone covered bottom including a baking area in which the bread may be baked. A top is connected to the bottom and disposed to form a domed chamber over the baking area. A constant heat source is connected to the bottom to provide a constant heat within the domed chamber. A flavor enhancing heat source burns a solid fuel and provides a flavor to the bread being baked. A first passageway extends through the top and has a size adequate to selectively place an unbaked bread within the chamber and remove a baked bread from the chamber. A second passageway extends through the top and has a size adequate to add the solid fuel to the flavor enhancing heat source.

BRIEF DESCRIPTION OF THE DRAWINGS

Other objects and advantages of the invention will become apparent upon reading the following detailed description and upon reference to the drawings, wherein like reference characters are used throughout to designate like parts.

BEST MODE FOR CARRYING OUT THE INVENTION

Figure 1:
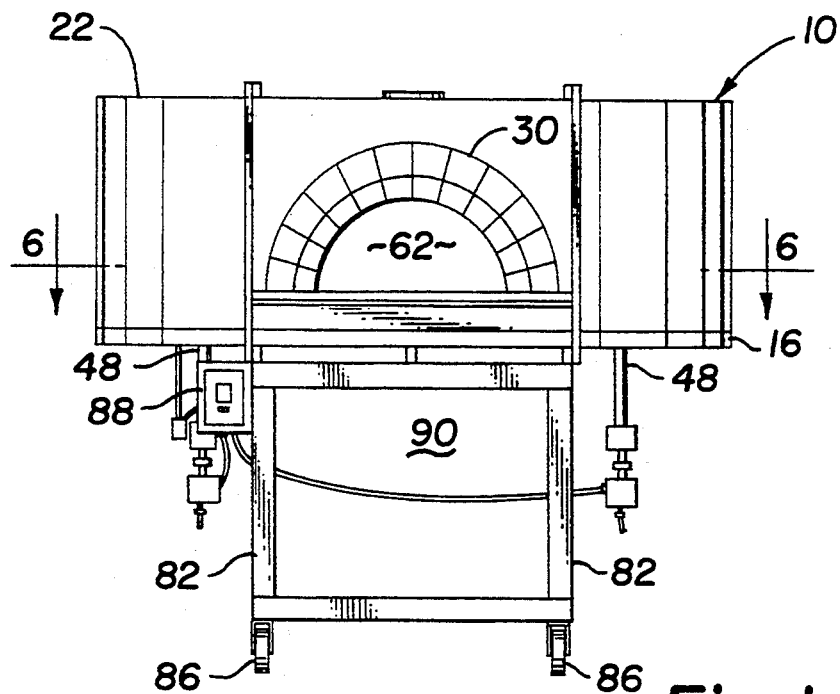
FIG. 1 is a front elevational view of an oven constructed in accordance with the present invention.
Figure 2:
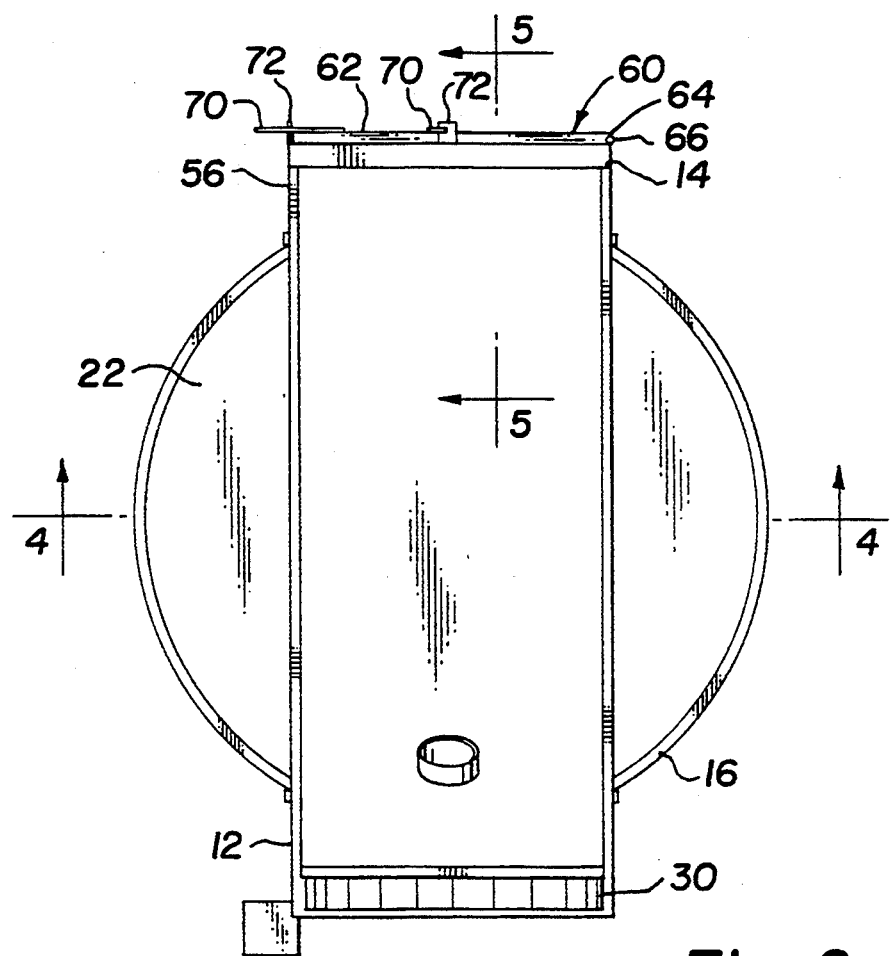
FIG. 2 is a top plan view of the oven shown in FIG. 1.

Turning now to FIGS. 1 and 2, there is shown an oven 10 for baking a food product constructed in accordance with the present invention. Oven 10 has a front 12, a back 14 and a bottom 16 that includes a baking area 18 in which the food product may be baked.

Figure 4:
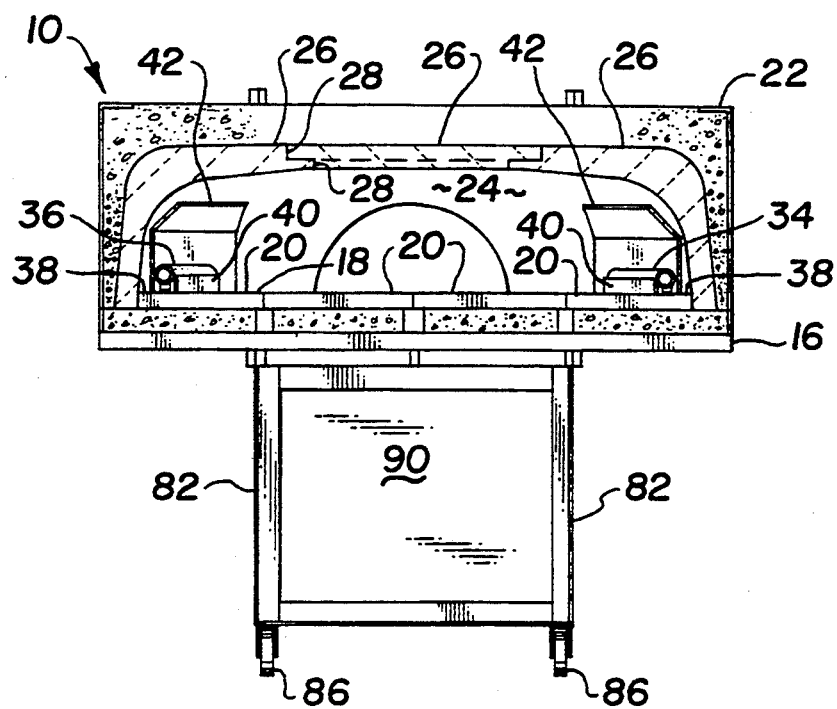
FIG. 4 is a sectional view of the oven shown in FIG. 2 taken along line 4—4 in the direction of the arrows.
Figure 5:
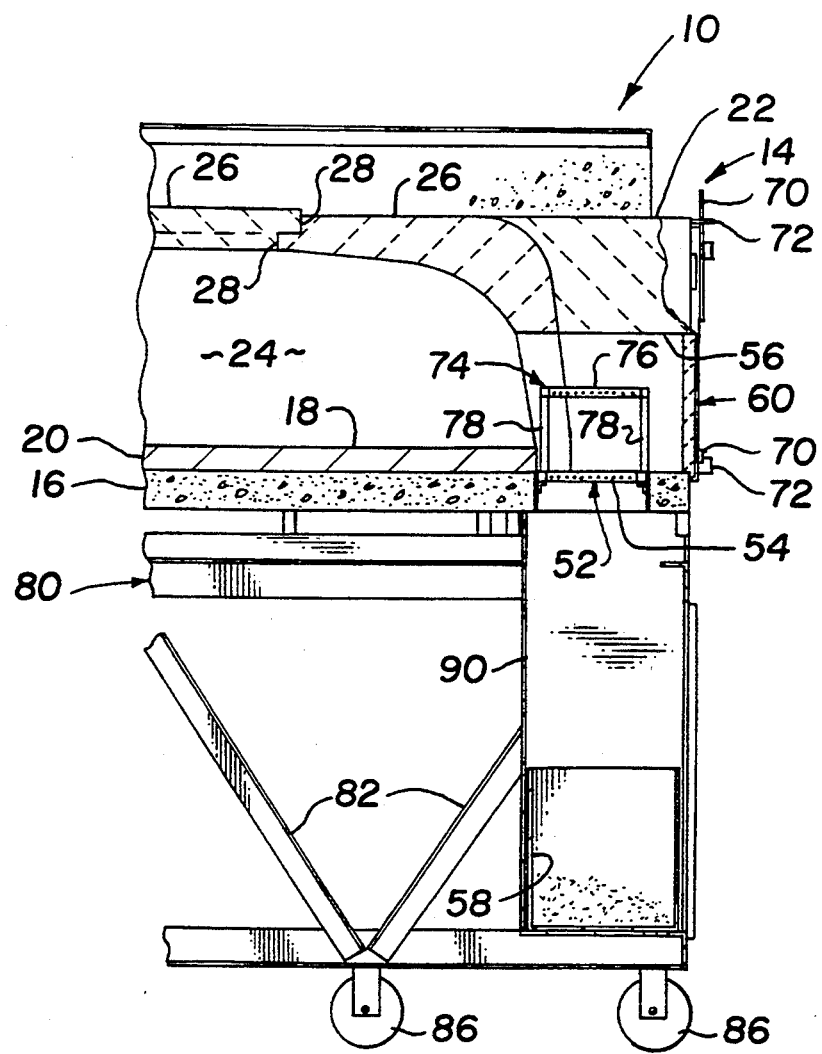
FIG. 5 is a sectional view of a portion of the oven shown in FIG. 2, taken along line 5—5 in the direction of the arrows.
Figure 6:
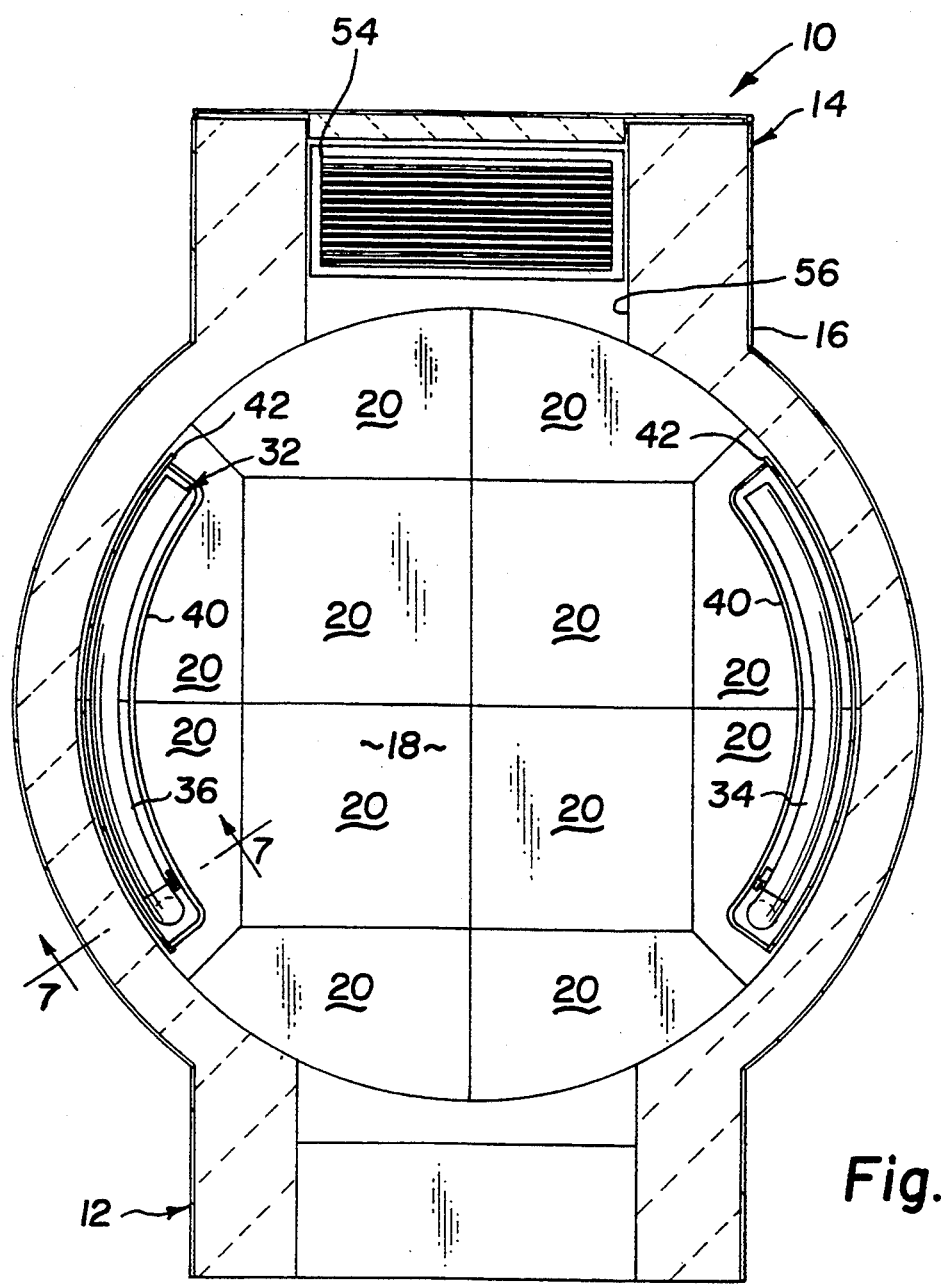
FIG. 6 is a sectional view of the oven shown in FIG. 1 taken along line 6—6 in the direction of the arrows.

As best seen in FIGS. 4, 5 and 6, a plurality of stones 20 are provided to support the food products during baking. Stones 20 are constructed from a conventional material and in a conventional manner to support the food products in baking area 18 on bottom 16.

As best seen in FIGS. 1 and 3–5, a top 22 is connected to bottom 16 and disposed to form a domed chamber 24 over baking area 18. Top 22 is made of conventional construction material, such as cement reinforced with lava rock. Top 22 is constructed from a plurality of pieces 26 that are shaped to provide the conventional dome configuration over baking area 18. Each piece 26 is constructed to permit expansion and contraction of the pieces caused by heat changes while preventing a piece from falling onto stones 20 covering bottom 16. It has been found that, when each piece 26 has an edge 28 with a tongue and groove configuration, this desirable result is obtained.

Figure 3:
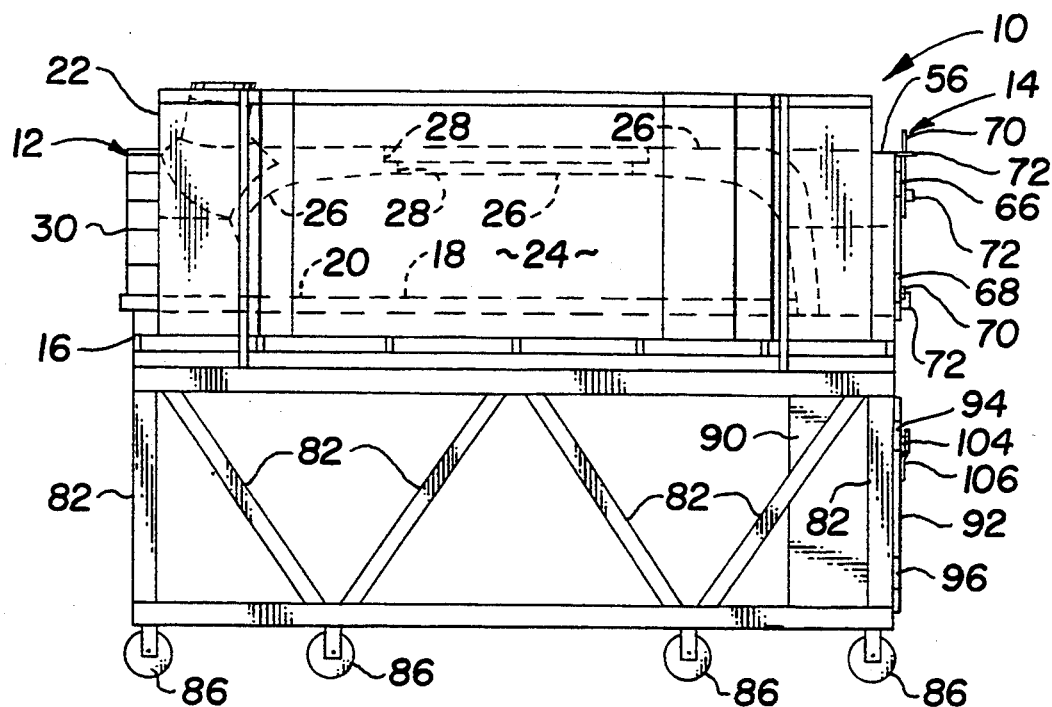
FIG. 3 is an elevational view of the oven shown in FIG. 1.

As best seen in FIGS. 1–3, a first passageway 30 is provided at front 12 of oven 10 through top 22 to permit access to chamber 24. First passageway 30 is constructed of such size to permit the food product to be passed therethrough, which permits the selective moving of an unbaked food product into chamber 24 and removing of a baked food product from chamber 24.

As best seen in FIGS. 1, 4 and 6–7, a constant heat source 32 is connected to bottom 16 to provide a constant heat within chamber 24. Constant heat source 32 is constructed to burn a fluid fuel, such as gas in a conventional manner. Although a single burner 34 may be used, it is preferred that a first burner 34 and a second burner 36 are provided to give a more constant heat. First and second burners 34 and 36, respectively, are disposed on each side of first passageway 30. Each burner of first and second burners 34 and 36, respectively, extends along an arc that complimentarily fits within chamber 24 and generally along an edge formed by junction 38 between bottom 16 and top 22. Also, first and second burners 34 and 36, respectively, are elongated and extend from front 12 toward back 14.

Figure 7:
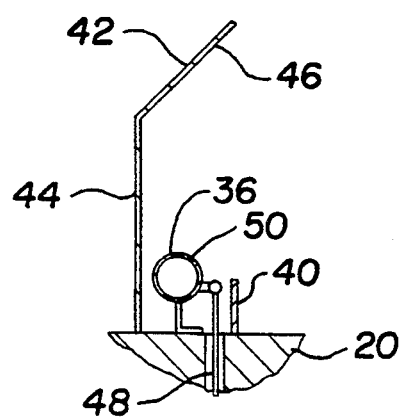
FIG. 7 is a sectional view of a portion of the oven shown in FIG. 6 taken along line 7—7 in the direction of the arrows.

As best seen in FIGS. 4 and 6–7, a food protecting shield 40 may be disposed around each burner 34 and 36 to prevent the food product from being placed too close to the respective burner.

A top protecting shield 42 may be disposed between the respective burner 34 or 36 and top 22 to prevent damage to top 22. Top protecting shield 42 includes a vertically extending portion 44 extending above stones 20 and a diverting portion 46 extending from the uppermost edge of vertically extending portion 44 to deflect the flame from the respective burner 34 or 36 away from the surface of top Fuel is supplied to each burner by a fuel providing line 48 that extends through bottom 16 and stones 20 to the respective burner, such as represented by burner 36 in FIG. 7. As the fuel passes through apertures 50 in each burner, it is burned when mixing with the air in chamber 24, in a conventional manner.

As best seen in FIGS. 5 and 6, a flavor enhancing heat source 52 burns a solid fuel to provide a flavor to the food product being baked in chamber 24. Flavor enhancing heat source 52 includes a grate 54 disposed within a second passageway 56. Grate 54 has openings sufficiently small to allow the solid fuel to be supported while being sufficiently wide to permit ashes to fall and air to pass to the solid fuel and assist in obtaining complete combustion of the solid fuel.

Figure 8:
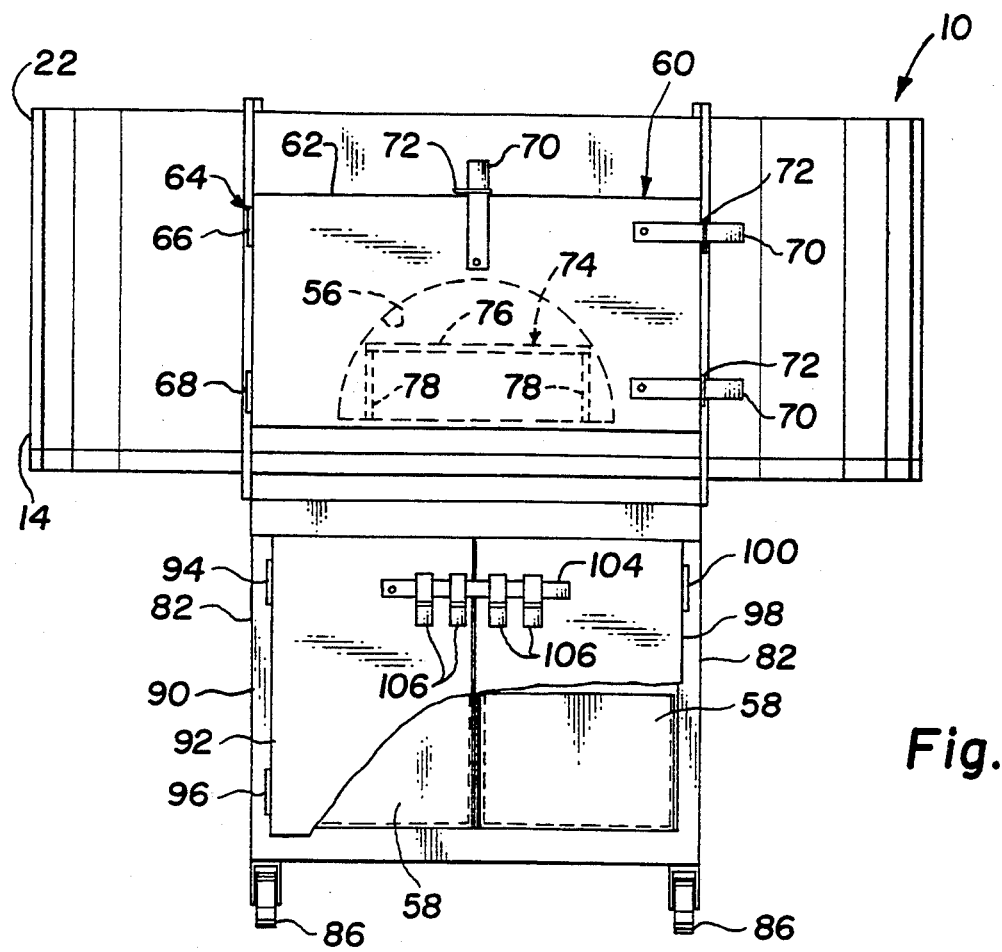
FIG. 8 is rear elevational view of the oven shown in FIG. 1.

As best seen in FIGS. 3, 5 and 8, an ash bin 58 is disposed beneath grate 54 to receive ashes from the solid fuel after being burned on the grate.

As best seen in FIGS. 1–3, second passageway 56 extends through top 22 to permit access into chamber 24 for removing a baked food product from chamber 24. Also, second passageway 56 is constructed of such sized as to permit solid fuel to be added to solid fuel heat source 52. When a fire is produced by the solid fuel in flavor enhancing heat source 52, it has been discovered that the free flow of air into chamber 24 is prevented.

As best seen in FIGS. 2, 5 and 8, cover or closing apparatus 60 is disposed at back 14 of oven 10 and across second passageway 56 for preventing free flow of air from an environment outside top 22 through second passageway 56 and to constant heat source 32. Closing apparatus 60 has a cover or door 62 connected to top 22 by a mounting apparatus 64.

Mounting apparatus 64 connects closing apparatus 60 to top 22 to allow sufficient air into chamber 24 to burn the fuels used in constant heat source 32 and in flavor enhancing heat source 52 without generating smoke and soot within chamber 24 while preventing free flow of air into chamber 24, which would allow uncontrolled burning of the fuels used in constant heat source 32 and in flavor enhancing heat source 52. Mounting apparatus 64 pivotally attaches door 62 by an upper hinge 66 and a lower hinge 68 to top 22 and secures door 62 to top 22 with three latches 70 pivotally connected to door 62 for rotation into engagement with a respective female member 72 connected to top 22. One latch 70 is provided at the upper portion of door 62 and two latches are provided, one above the other, at the side portion of door 62.

As best seen in FIGS. 5 and 8, since it is not desirable to allow grease to be deposited on stones 20, a removable cooking grill 74 may be disposed above flavor enhancing heat source 52 and grate 54 to enable meat products to be cooked in oven 10. Grill 74 has a cooking surface 76 similar to conventional grills and four legs 78 of a length allowing grill 74 to be positioned within second passageway 56 to allow the fire from the solid fuel to be used to block the free flow of air through second passageway 56. For this reason, legs 78 have a length sufficient to permit a fire to be provided above grate 54, and a shortness sufficient to allow the food product to be placed on top of cooking surface 76 inside of second passageway 56.

A supporting apparatus 80 is disposed beneath oven 10 to move oven 10 into and out of locations with the only hookup required being the fuel and electricity. Supporting apparatus 80 has a framework 82 supported by a wheel 86 rotatably connected to the lower portion of the framework.

A conventional controlling apparatus 88 is connected to the front of framework 82 and used to control the fuel flowing to fuel line 48 of constant heat source 32.

Two ash bins 58 are supported within a support closet 90 located at the rear of framework 82. A left door 92 is connected by an upper hinge 94 and a lower hinge 96 to framework 82. A right door 98 is connected by an upper hinge 100 and a lower hinge (not shown) respectively, to framework 82. Left door 92 is connected to right door 98 by a latch 104 pivotally connected to left door 92 that is rotated into engagement with a series of slots formed by two connecting members 106 provided on each door 92 and 98.

In operation, oven 10 is positioned in the desired location and the fluid fuel and electricity hooked up to controlling apparatus 88. Ash bins 58 are positioned in closet 90 and under grate 54. Door 62 of closing apparatus 60 is opened by moving latches 70 out of engagement with the respective female member 72 and rotating door 62 away from top 22. The solid fuel is passed through second passageway 56, placed onto grate 54 and started. Door 62 of closing apparatus 60 is then closed by rotating door 62 toward top 22 and each latch 70 rotated into engagement with the respective female member 72. Controlling apparatus 88 is activated to start the fires in constant heat source 32 and oven chamber 24 heated to the desired setting. After oven chamber 24 is heated to the desired setting, one or more of the food products, such as bread or pizza, is inserted through first passageway 30 into chamber 24 and permitted to bake. After the food product is baked, door 62 is opened and the food products removed over flavor enhancing heat source 52 and grill 74. Door 62 is left open until all of the baked food product is removed and then closed. While the food product is being removed through second passageway 56, additional food product may be added through first passageway 30.

If desired, meat may be added to grill 74 for cooking at any time after oven 10 has been heated to the desired setting. The fats from the cooking meat will pass through the grate without being deposited onto the bricks.

The invention having been described, what is claimed is:

1. An oven for baking a food product, comprising: a stone covered bottom including a baking area in which the food product may be baked; a top connected to said bottom and constructed to form a domed chamber over the baking area; a constant heat source connected to said bottom to provide a constant heat within the chamber, said constant heat source including a burner located above said bottom and laterally spaced from the baking area at the periphery of said bottom so as to direct heat emanating therefrom inwardly toward the baking area; a first passageway extending through the top and having a size sufficient to pass an unbaked food product into the chamber; and a second passageway extending through the top and having a size sufficient to remove a baked food product from the chamber.

2. An oven as set forth in claim 1, further comprising: said top being constructed from a plurality of shaped pieces made of construction material, each piece having an edge constructed to be complimentary with an edge on another piece, and when assembled to permit expansion and contraction of the pieces caused by heat changes while preventing a piece from falling onto said bottom.

3. An oven for baking a food product, comprising: a stone covered bottom including a baking area in which the food product may be baked; a top connected to said bottom and constructed to form a domed chamber over the baking area; a constant heat source connected to said bottom to provide a constant heat within the chamber; a first passageway extending through the top and having a size sufficient to pass an unbaked food product into the chamber; and a second passageway extending through the top and having a size sufficient to remove a baked food product from the chamber; a flavor enhancing heat source to burn a solid fuel that provides a flavor to the food product being baked, said flavor enhancing heat source including a grate disposed within said second passageway to support the solid fuel when being burned.

4. An oven as set forth in claim 3, further comprising: an ash bin disposed beneath the grate in said flavor enhancing heat source to receive ashes from the solid fuel being burned on the grate.

5. An oven as set forth in claim 4, further comprising: a grill disposed above said flavor enhancing heat source to cook meat products.

6. An oven for baking a food product, comprising: a stone covered bottom including a baking area in which the food product may be baked; a top connected to said bottom and constructed to form a domed chamber over the baking area; a constant heat source connected to said bottom to provide a constant heat within the chamber, said constant heat source including a burner located above said bottom and laterally spaced from the baking area at the periphery of said bottom so as to direct heat emanating therefrom toward the baking area; a first passageway extending through the top permitting continuous access into the baking area and having a size sufficient to pass an unbaked food product into the chamber; a second passageway extending through the top and having a size sufficient to remove a baked food product from the chamber; closing means disposed across said second passageway for preventing free flow of air from an environment outside said top through said second passageway and to said constant heat source; and mounting means connecting said closing means to said top for insuring said constant heat source has adequate air to burn fuel used in said constant heat source without generating smoke and soot within the chamber.

7. An oven as set forth in claim 6, further comprising: a flavor enhancing heat source for burning solid fuel to provide a flavor to the food product being baked.

8. An oven for baking a food product, comprising: a stone covered bottom including a baking area in which the food product may be baked; a top connected to said bottom and constructed to form a domed chamber over the baking area; a constant heat source connected to said bottom to provide a constant heat within the chamber; a first passageway extending through the top and having a size sufficient to pass an unbaked food product into the chamber; and a second passageway extending through the top and having a size sufficient to remove a baked food product from the chamber; said constant heat source being adapted to burn fluid fuel, and further including a burner extending along an arc that complimentarily fits within the chamber and along an edge formed by a junction between said bottom and top and disposed to extend between said first and second passageways.

9. An oven for baking a food product, comprising: a stone covered bottom including a baking area in which the food product may be baked; a top connected to said bottom and constructed to form a domed chamber over the baking area; a constant heat source connected to said bottom to provide a constant heat within the chamber; a first passageway extending through the top and having a size sufficient to pass an unbaked food product into the chamber; and a second passageway extending through the top and having a size sufficient to remove a baked food product from the chamber; said first passageway having sides; and said constant heat source including a burner located above said bottom and laterally spaced from the baking area at the periphery of said bottom so as to direct heat emanating therefrom inwardly toward the baking area.

10. An oven as set forth in claim 9, further comprising: said constant heat source being adapted to burn fluid fuel, and further including first and second burners disposed on each side of said first passageway; each burner of said first and second burners extending along an arc that complimentarily fits within the chamber and along an edge formed by a junction between said bottom and top and disposed to extend between said first and second passageways.

11. An oven for baking a food product, comprising: a stone covered bottom including a baking area in which the food product may be baked; a top connected to said bottom and constructed to form a domed chamber over the baking area; a constant heat source connected to said bottom to provide a constant heat within the domed chamber, said constant heat source including a burner located above said bottom and laterally spaced from the baking area at the periphery of said bottom so as to direct heat emanating therefrom inwardly toward the baking area; a flavor enhancing heat source constructed to burn a solid fuel that provides a flavor to the food product being baked; a first passageway extending through the top and having a size adequate to selectively place an unbaked food product within the chamber and remove a baked food product from the chamber; and a second passageway extending through the top and having a size adequate to provide the solid fuel to said flavor enhancing heat source.

12. An oven as set forth in claim 11, further comprising: said top being constructed from a plurality of shaped pieces made of construction material, each piece having an edge constructed to be complimentary with an edge on another piece, and when assembled to permit expansion and contraction of the pieces caused by heat changes while preventing a piece from falling onto said bottom.

13. An oven for baking a food product, comprising: a stone covered bottom including a baking area in which the food product may be baked; a top connected to said bottom and constructed to form a domed chamber over the baking area; a constant heat source connected to said bottom to provide a constant heat within the domed chamber; a flavor enhancing heat source constructed to burn a solid fuel that provides a flavor to the food product being baked; a first passageway extending through the top and having a size adequate to selectively place an unbaked food product within the chamber and remove a baked food product from the chamber; and a second passageway extending through the top and having a size adequate to provide the solid fuel to said flavor enhancing heat source; said flavor enhancing heat source including a grate disposed within said second passageway to support the solid fuel when being burned.

14. An oven as set forth in claim 13, further comprising: an ash bin disposed beneath the grate in said flavor enhancing heat source to receive ashes from the solid fuel being burned on the grate.

15. An oven as set forth in claim 14, further comprising: a grill disposed above said flavor enhancing heat source to cook meat products.

16. An oven for baking a food product, comprising: a stone covered bottom including a baking area in which the food product may be baked; a top connected to said bottom and constructed to form a domed chamber over the baking area; a constant heat source connected to said bottom to provide a constant heat within the domed chamber, said constant heat source including a burner located above said bottom and laterally spaced from the baking area at the periphery of said bottom so as to direct heat emanating therefrom inwardly toward the baking area; a flavor enhancing heat source constructed to burn a solid fuel that provides a flavor to the food product being baked; a first passageway extending through the top permitting continuous access into the baking area and having a size adequate to selectively place an unbaked food product within the chamber and remove a baked food product from the chamber; a second passageway extending through the top and having a size adequate to provide the solid fuel to said flavor enhancing heat source; closing means disposed across said second passageway for preventing free flow of air from an environment outside said top through said second passageway and to said heat sources; and mounting means connecting said closing means to said top for insuring said sources have adequate air to burn fuels used in said heat sources without generating smoke and soot within the chamber.

17. An oven for baking a food product, comprising: a stone covered bottom including a baking area in which the food product may be baked; a top connected to said bottom and constructed to form a domed chamber over the baking area; a constant heat source connected to said bottom to provide a constant heat within the domed chamber; a flavor enhancing heat source constructed to burn a solid fuel that provides a flavor to the food product being baked; a first passageway extending through the top and having a size adequate to selectively place an unbaked food product within the chamber and remove a baked food product from the chamber; and a second passageway extending through the top and having a size adequate to provide the solid fuel to said flavor enhancing heat source; said constant heat source being adapted to burn fluid fuel, and further including a burner extending along an arc that complimentarily fits within the chamber and along an edge formed by a junction between said bottom and top and disposed to extend between said first and second passageways.

18. An oven for baking a food product, comprising: a stone covered bottom including a baking area in which the food product may be baked; a top connected to said bottom and constructed to form a domed chamber over the baking area; a constant heat source connected to said bottom to provide a constant heat within the domed chamber; a flavor enhancing heat source constructed to burn a solid fuel that provides a flavor to the food product being baked; a first passageway extending through the top and having a size adequate to selectively place an unbaked food product within the chamber and remove a baked food product from the chamber; and a second passageway extending through the top and having a size adequate to provide the solid fuel to said flavor enhancing heat source; said first passageway having sides; and said constant heat source including a burner located above said bottom and laterally spaced from the baking area at the periphery of said bottom so as to direct heat emanating therefrom inwardly toward the baking area.

19. An oven as set forth in claim 18, further comprising: said constant heat source being adapted to burn fluid fuel, and further including first and second burners disposed on each side of said first passageway, each burner of said first and second burners extending along an arc that complimentarily fits within the chamber and along an edge formed by a junction between said bottom and top and disposed to extend between said first and second passageways.

20. An oven for baking a food product, comprising: a bottom including a baking area in which the food product may be baked; a plurality of stones for supporting food product during baking covering the baking area of said bottom; a top connected to said bottom and disposed to form a domed chamber over the baking area, said top being constructed from a plurality of shaped pieces made of construction material, each piece having an edge constructed to be complimentary with an edge on another piece, and when assembled to permit expansion and contraction of the pieces caused by heat changes while preventing a piece from falling onto said bottom; a first passageway through the top to permit access to the chamber for selectively placing an unbaked food product within the chamber and removing a baked food product from the chamber, said first passageway having sides; a second passageway through the top to permit access to the chamber for removing a baked food product from the chamber; a constant heat source connected to said bottom to provide a constant heat within the chamber, said constant heat source being adapted to burn fluid fuel, and further including first and second burners disposed on each side of said first passageway, each burner of said first and second burners extending along an arc that complimentarily fits within the chamber and along an edge formed by a junction between said bottom and top and disposed to extend between said first and second passageways; a flavor enhancing heat source to burn a solid fuel that provides a flavor to the food product being baked, said flavor enhancing heat source including a grate disposed within said second passageway; an ash bin disposed beneath the grate in said flavor enhancing heat source to receive ashes from the solid fuel being burned on the grate; said second passageway through the top being adapted to provide access to permit solid fuel to be added to said flavor enhancing heat source; closing means disposed across said second passageway for preventing free flow of air from an environment outside said top through said second passageway and to said constant heat source; and mounting means connecting said closing means to said top for permitting said constant heat source sufficient air into the chamber to burn fuel used in said constant heat source and in said flavor enhancing heat source without generating smoke and soot within the chamber.

21. An oven as set forth in claim 20, further comprising: a grill disposed above said flavor enhancing heat source to cook meat products.

* * * * *